US009946330B2

(12) United States Patent
Kouge

(10) Patent No.: US 9,946,330 B2
(45) Date of Patent: Apr. 17, 2018

(54) INFORMATION PROCESSING APPARATUS, NON-TRANSITORY COMPUTER READABLE MEDIUM, AND INFORMATION PROCESSING METHOD

(71) Applicant: FUJI XEROX CO., LTD., Tokyo (JP)

(72) Inventor: Masahiro Kouge, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 36 days.

(21) Appl. No.: 14/705,110

(22) Filed: May 6, 2015

(65) Prior Publication Data

US 2016/0154450 A1   Jun. 2, 2016

(30) Foreign Application Priority Data

Dec. 1, 2014 (JP) ................................. 2014-243461

(51) Int. Cl.
*G06F 1/32* (2006.01)

(52) U.S. Cl.
CPC .......... *G06F 1/3287* (2013.01); *G06F 1/3278* (2013.01); *Y02B 60/126* (2013.01); *Y02B 60/1282* (2013.01)

(58) Field of Classification Search
CPC .... G06F 1/3293; G06F 1/3278; G06F 1/3287; H04W 52/0229; Y02B 60/50
See application file for complete search history.

(56) References Cited

U.S. PATENT DOCUMENTS

| 5,802,305 | A  | * | 9/1998  | McKaughan | G06F 1/3209 709/227 |
| 6,098,100 | A  | * | 8/2000  | Wey       | G06F 13/385 370/324 |
| 6,493,824 | B1 | * | 12/2002 | Novoa     | H04L 12/12 709/203  |
| 7,194,642 | B2 | * | 3/2007  | Pontarelli| H04W 52/0251 713/320 |

(Continued)

FOREIGN PATENT DOCUMENTS

| CN | 103051463 A  | 4/2013 |
| JP | 2012-151681 A | 8/2012 |

OTHER PUBLICATIONS

Communication dated Dec. 4, 2017 from the State Intellectual Property Office of the P.R.C. in counterpart Chinese application No. 201510387937.3.

*Primary Examiner* — Jaweed A Abbaszadeh
*Assistant Examiner* — Brian J Corcoran
(74) *Attorney, Agent, or Firm* — Sughrue Mion, PLLC

(57) ABSTRACT

An information processing apparatus includes transmitting-receiving units, response processing units, and a switching unit. The transmitting-receiving units transmit data to and receive data from networks. An operation state of each of the response processing units is able to be switched between a first state and a second state. The switching unit performs switching between the first state and the second state of each of the response processing units. The transmitting-receiving units and the response processing units are provided for (Continued)

plural respective networks. In a case where all the response processing units are in the second state, the switching unit switches, among all the response processing units, an operation state of a response processing unit that has received predetermined data from the second state to the first state.

20 Claims, 8 Drawing Sheets

(56) References Cited

U.S. PATENT DOCUMENTS

| | | | | |
|---|---|---|---|---|
| 2002/0025839 | A1* | 2/2002 | Usui | H04B 1/38 455/574 |
| 2006/0274368 | A1* | 12/2006 | Imine | G06K 15/00 358/1.15 |
| 2011/0078464 | A1* | 3/2011 | Yokomizo | G06F 1/3203 713/300 |
| 2011/0208986 | A1* | 8/2011 | Soga | G03G 15/5004 713/323 |
| 2013/0067060 | A1* | 3/2013 | Thaler | H04W 52/0229 709/224 |
| 2015/0074432 | A1* | 3/2015 | Winter | G06F 1/3209 713/300 |

* cited by examiner

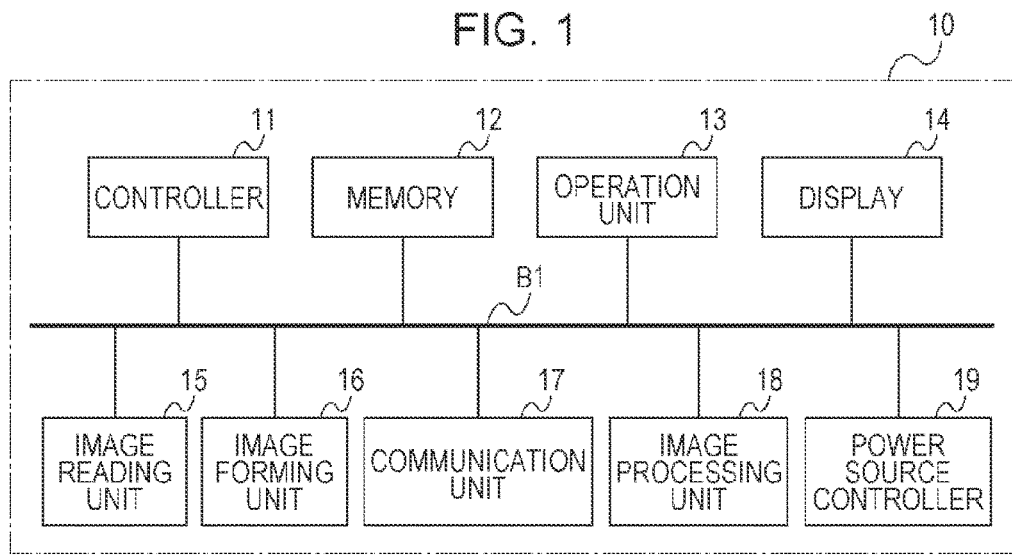
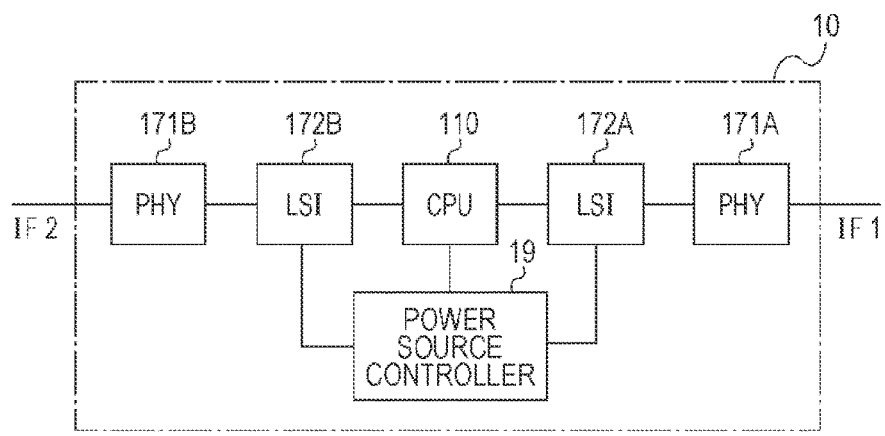

| OPERATION MODE OF IMAGE FORMING APPARATUS | ON-OFF OF CPU | OPERATION MODE OF LSI | POWER-SAVING PERFORMANCE |
|---|---|---|---|
| NORMAL MODE | ON | ALL LSIS ARE IN PASS-THRU MODE | NOT GOOD |
| SLEEP MODE | OFF | ALL LSIS ARE IN RESPONSE STANDBY MODE | GOOD |
| POWER-SAVING MODE | ON | MIXTURE OF LSI OPERATING IN PASS-THRU MODE AND LSI OPERATING IN RESPONSE STANDBY MODE | NOT VERY GOOD |

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2014-243461 filed Dec. 1, 2014.

BACKGROUND

Technical Field

The present invention relates to an information processing apparatus, a non-transitory computer readable medium, and an information processing method.

SUMMARY

According to an aspect of the invention, there is provided an information processing apparatus including transmitting-receiving units, response processing units, and a switching unit. The transmitting-receiving units transmit data to and receive data from networks. An operation state of each of the response processing units is able to be switched between a first state and a second state, the first state being a state in which the response processing unit does not perform response processing on data received from a corresponding transmitting-receiving unit and relegates processing of the data to a processing unit located downstream thereof, the second state being a state in which the response processing unit does not relegate processing of data received from the corresponding transmitting-receiving unit to the processing unit located downstream thereof and performs response processing on at least a portion of the data. The switching unit performs switching between the first state and the second state of each of the response processing units. The transmitting-receiving units and the response processing units are provided for plural respective networks. In a case where all the response processing units are in the second state, the switching unit switches, among all the response processing units, an operation state of a response processing unit that has received predetermined data from the second state to the first state.

BRIEF DESCRIPTION OF THE DRAWINGS

An exemplary embodiment of the present invention will be described in detail based on the following figures, wherein:

FIG. 1 is a block diagram illustrating a hardware configuration of an image forming apparatus;

FIG. 2 is a block diagram illustrating a hardware configuration used to realize a communication function;

DETAILED DESCRIPTION

Figure 3:
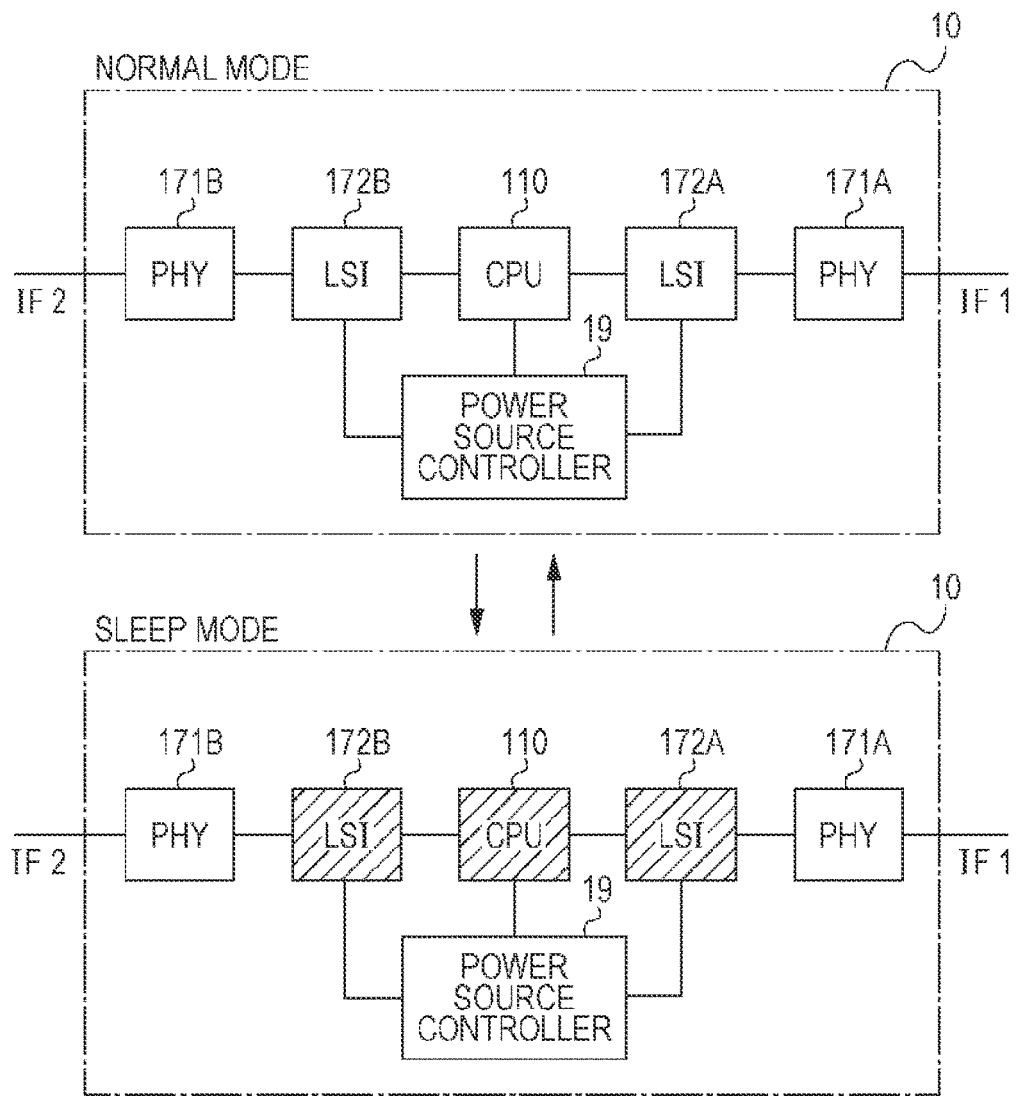
FIG. 3 is a diagram illustrating operation modes of the image forming apparatus according to a comparative example.

FIG. 1 is a block diagram illustrating a hardware configuration of an image forming apparatus 10. As illustrated in FIG. 1, the image forming apparatus 10 includes a controller 11, a memory 12, an operation unit 13, a display 14, an image reading unit 15, an image forming unit 16, a communication unit 17, an image processing unit 18, and a power source controller 19. In addition, various units of the image forming apparatus 10 are connected to a bus B1, and various types of data are transmitted and received via the bus B1.

The controller 11 is a unit that controls operations of the various units of the image forming apparatus 10. The controller 11 includes a processing unit such as a central processing unit (CPU), and a storage medium (a main storage device) such as a read-only memory (ROM), a random-access memory (RAM), and the like. The CPU (a CPU 110, which will be described later) reads programs stored in the ROM and the memory 12, and executes the programs by using the RAM as a work area. By executing the programs in this manner, the controller 11 realizes forming of images on sheets, reading of an image from a document and generation of image data, performing of communication with another apparatus through communication lines, and the like.

The memory 12 is a unit that stores data. The memory 12 includes a storage medium (an auxiliary storage device) such as a hard disk, a flash memory, and the like, and stores data received by the communication unit 17, data generated by the image forming apparatus 10, and the like. In addition, the memory 12 may also include a removable storage medium (a removable medium), which is a so-called memory card, a USB memory, or the like, and a unit that reads data from and write data into the storage medium.

The operation unit 13 is a unit that receives an operation of a user. The operation unit 13 includes operators (a button, a key, and the like), and supplies a control signal corresponding to a pressed operator to the controller 11. In addition, the operation unit 13 may also be constituted by a touch panel, which includes the display 14 and a sensor provided so as to overlie a display surface of the display 14 and supplies a control signal corresponding to a position being pressed to the controller 11.

The display 14 is a unit that displays information. The display 14 includes, for example, a liquid crystal display as a display apparatus. The display 14 displays, under control of the controller 11, a menu screen for operating the image forming apparatus 10.

The image reading unit 15 is a unit that reads a document and converts the resulting data into image data. The image reading unit 15 includes an image reading device that optically reads a document and generates image data representing an image of the read document. The image reading unit 15 supplies the generated image data to the image processing unit 18.

The image forming unit 16 is a unit that forms an image on a sheet. The image forming unit 16 includes an image forming mechanism that forms toner images of color components of YMCK on sheets using an electrophotographic system. Note that, the system used in the image forming mechanism is not limited to the electrophotographic system, and other recording systems such as an ink-jet system may also be used.

The communication unit 17 is a unit that transmits and receives data. The communication unit 17 is connected to a communication line and functions as a communication interface that performs communication with external apparatuses in a wired or wireless manner (hereinafter referred to as a "communication IF"). In an exemplary embodiment according to the invention, the communication unit 17 has plural physical layers (PHYs) 171 and plural large-scale integrated circuits (LSIs) 172 (see FIG. 2), which will be described later, and functions as plural communication IFs.

The image processing unit 18 is a unit that performs image processing on image data. Here, the image processing is, for example, color correction and tone correction. In the case where a print function is executed in the image forming apparatus 10, the image processing unit 18 supplies image data on which the image processing is performed to the image forming unit 16.

The power source controller 19 is electrically connected to a power source, which is not illustrated, and controls power supply from the power source to the various units of the image forming apparatus 10. The power source controller 19 controls power supply by reading a program stored in a storage area of the power source controller 19 and executing the program.

FIG. 2 is a block diagram illustrating a configuration used to realize a communication function among the hardware configuration of the image forming apparatus 10. As illustrated in FIG. 2, the image forming apparatus 10 realizes the communication function using the CPU 110, the PHYs 171, the LSIs 172, and the power source controller 19. Note that, in the configuration illustrated in FIG. 2, the PHYs 171 and the LSIs 172 are included in the communication unit 17. Such a PHY 171 defines a physical system regarding connection to a network and data transmission in the physical later of the open systems interconnection (OSI) reference model. In the exemplary embodiment according to the invention, the communication unit 17 has two communication IFs (a communication IF 1 and a communication IF 2), and has two PHYs 171 (a PHY 171A and a PHY 171B). Note that, in the exemplary embodiment, the case will be described where two communication IFs are used; however, the exemplary embodiment according to the invention is not limited to the case where two communication IFs are used. In FIG. 2, the PHY 171A is provided for the communication IF 1, and the PHY 171B is provided for the communication IF 2. The communication IF 1 and the communication IF 2 are connected to respective communication lines, which are different from each other. As a specific example, one of the communication IF 1 and the communication IF 2 is connected to the Internet, and the other one is connected to a local-area network (LAN) such as an intranet. In another example, the communication IF 1 and the communication IF 2 are connected to communication lines of respective groups (an office, a section, and the like), which are different from each other. Note that the communication IF 1 and the communication IF 2 may use either a wired system or a wireless system.

The CPU 110 performs communication through the communication IF 1 and the communication IF 2. When the CPU 110 is in a state in which power is supplied to the CPU 110 or in a state in which the CPU 110 is fully operable (when the CPU 110 is on), the CPU 110 processes packets (each of which is an example of a data unit) output from at least one of an LSI 172A and an LSI 172B, which will be described later. When the CPU 110 is in a state in which power is not supplied to a portion or the entirety of the CPU 110 or in a state in which some or all of the functions of the CPU 110 are stopped (when the CPU 110 is off), the CPU 110 does not perform the processing. In the latter case, the state in which power is not supplied to a portion or the entirety of the CPU 110 is, for example, a state in which the CPU 110 has shifted to be in a low power state, which is set for a state in which the image forming apparatus 10 is not used for a predetermined time period, or the like.

Such an LSI 172 is a so-called network-answering proxy LSI, which processes, on behalf of the CPU 110 being in an off state, packets received by a communication IF. Such an LSI 172 is used to reduce power consumption in the CPU 110. The communication unit 17 has two LSIs 172 (the LSI 172A and the LSI 172B) corresponding to the respective communication IFs. In FIG. 2, the LSI 172A is a network-answering proxy LSI corresponding to the communication IF 1 and is provided between the PHY 171A and the CPU 110. The LSI 172B is a network-answering proxy LSI corresponding to the communication IF 2 and is provided between the PHY 171B and the CPU 110. The LSIs 172 operate in either of operations modes: a pass-thru mode and a response standby mode. The pass-thru mode is an operation mode in which such an LSI 172 outputs packets received by the communication IF to the CPU 110. The response standby mode is an operation mode in which such an LSI 172 responds through the communication IF to at least some of the packets received by the communication IF. In the following, an operation in which such an LSI 172 being in the response standby mode responds, on its own, to received packets is referred to as "automatic response". While operating, such an LSI 172 consumes less power in the response standby mode than in the pass-thru mode.

The power source controller 19 controls power supply to the CPU 110 and the LSIs 172. The power source controller 19 switches on-off of the CPU 110, and furthermore switches the operation modes of the LSIs 172.

FIG. 3 is a diagram illustrating operation modes of the image forming apparatus 10 according to a comparative example. In this example, the image forming apparatus 10 communicates with an external apparatus in either of two operation modes: a normal mode and a sleep mode. Note that, in FIG. 3 (and FIGS. 5, 7, and 8, which will be described later), a CPU 110 that is hatched indicates that the CPU 110 is off, and a CPU 110 that is not hatched indicates that the CPU 110 is on. In addition, an LSI 172 that is hatched indicates that the operation mode of the LSI 172 is the response standby mode, and an LSI 172 that is not hatched indicates that the operation mode of the LSI 172 is the pass-thru mode.

The normal mode is an operation mode in which the CPU 110 is on and the LSI 172A and the LSI 172B are in the pass-thru mode. In the normal mode, packets received by the communication IF 1 and the communication IF 2 are transmitted to the CPU 110 via the LSIs 172. In this case, the CPU 110 performs processing corresponding to the content of the received packets. The sleep mode is an operation mode in which the CPU 110 is off and the LSI 172A and the LSI 172B are in the response standby mode. In the sleep mode, packets received by the communication IF 1 and the communication IF 2 are transmitted to the corresponding LSIs 172, and the LSIs 172 perform processing corresponding to the content of the received packets (automatic response or packet discard). Thus, in the sleep mode, the packets received by the communication IF 1 and the communication IF 2 are processed by the LSIs 172 without being transmitted to the CPU 110. For example, when predetermined conditions (hereinafter referred to as "power-saving conditions") are met such as in the case where no packets are received over a predetermined time period by the communication IF 1 and the communication IF 2, the operation mode of the image forming apparatus 10 is switched from the normal mode to the sleep mode. When a packet for which the CPU 110 needs to be on (that is, a packet that needs to be processed by the CPU 110, which is hereinafter referred to as a "recovery packet") is input to the communication IF 1 or the communication IF 2, the operation mode of the image forming apparatus 10 is switched from the sleep mode to the normal mode.

For switching of the operation modes of the image forming apparatus 10 illustrated in FIG. 3, since on-off of the CPU 110 corresponds to the operation modes of all the LSIs 172 on a one-to-one basis, the LSI 172A and the LSI 172B operate in the same operation mode. However, as described above, since the LSIs 172 consume less power in the response standby mode than in the pass-thru mode, when the LSI 172A and the LSI 172B operate in the same operation mode, there may be the case where the LSIs 172 consume additional power. For example, even in the case where a recovery packet is received by either one of the communication IF 1 and the communication IF 2 and thus the operation mode of the image forming apparatus 10 is switched from the sleep mode to the normal mode, a recovery packet is not always immediately received by the other communication IF. In this case, in an LSI 172 corresponding to a communication IF that has not received a recovery packet, additional power is consumed by switching the operation mode of the LSI 172 from the response standby mode to the pass-thru mode.

Figure 4:
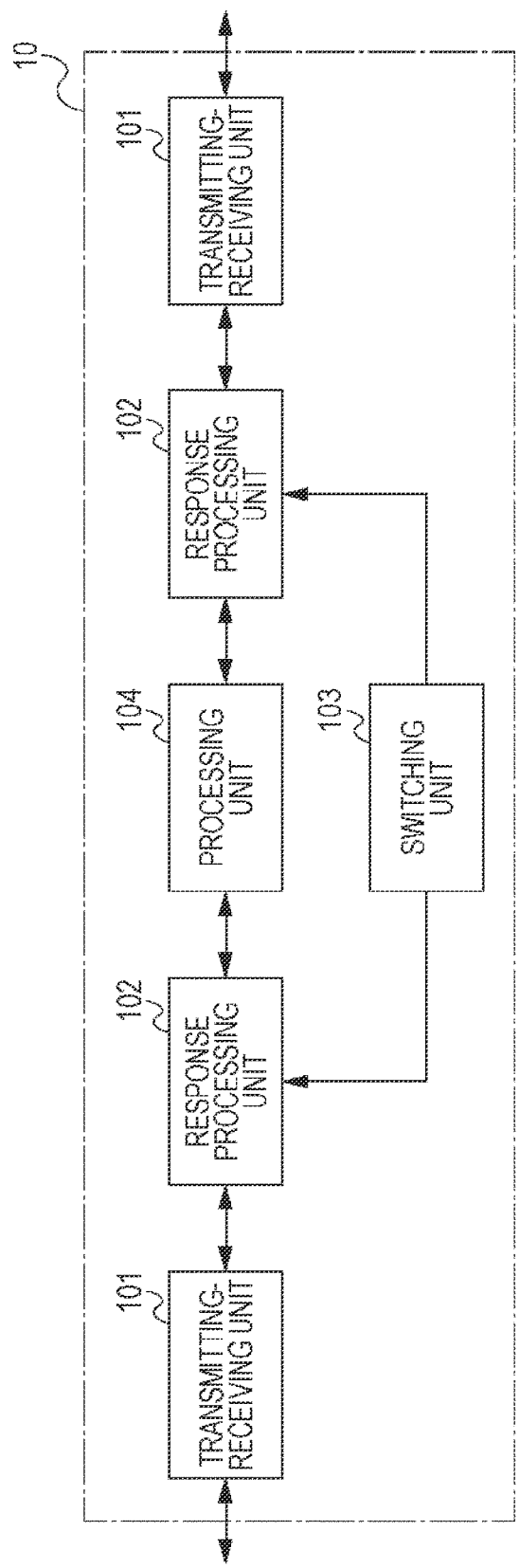
FIG. 4 is a block diagram illustrating a functional configuration of the image forming apparatus.

FIG. 4 is a block diagram illustrating a functional configuration of the image forming apparatus 10. The image forming apparatus 10 includes transmitting-receiving units 101, response processing units 102, a switching unit 103, and a processing unit 104. The transmitting-receiving units 101 transmit data to and receives data from a network. The response processing units 102 operate in either of operation modes: a pass-thru mode and a response standby mode. When such a response processing unit 102 is in the pass-thru mode, the response processing unit 102 does not perform response processing on data received from the corresponding transmitting-receiving unit 101 and relegates processing of the data to the processing unit 104, which is located downstream thereof. When such a response processing unit 102 is in the response standby mode, the response processing unit 102 does not relegate processing of the data received from the corresponding transmitting-receiving unit 101 to the processing unit 104, which is located downstream thereof, and performs response processing on at least a portion of the data. The transmitting-receiving units 101 and the response processing units 102 are provided for plural respective networks. The switching unit 103 switches the operation mode of each of the response processing units 102 between the pass-thru mode and the response standby mode. In the case where all the response processing units 102 are in the response standby mode, the switching unit 103 switches, among all the response processing units 102, the operation mode of a response processing unit 102 that has received predetermined data from the response standby mode to the pass-thru mode.

In the configuration illustrated in FIG. 2, the PHYs 171 are an example of the transmitting-receiving units 101. The LSIs 172 are an example of the response processing units 102. The power source controller 19, which executes a program for controlling power supply, is an example of the switching unit 103. The CPU 110, which executes a program for controlling communication in the communication IFs, is an example of the processing unit 104.

Figures 5, 6:
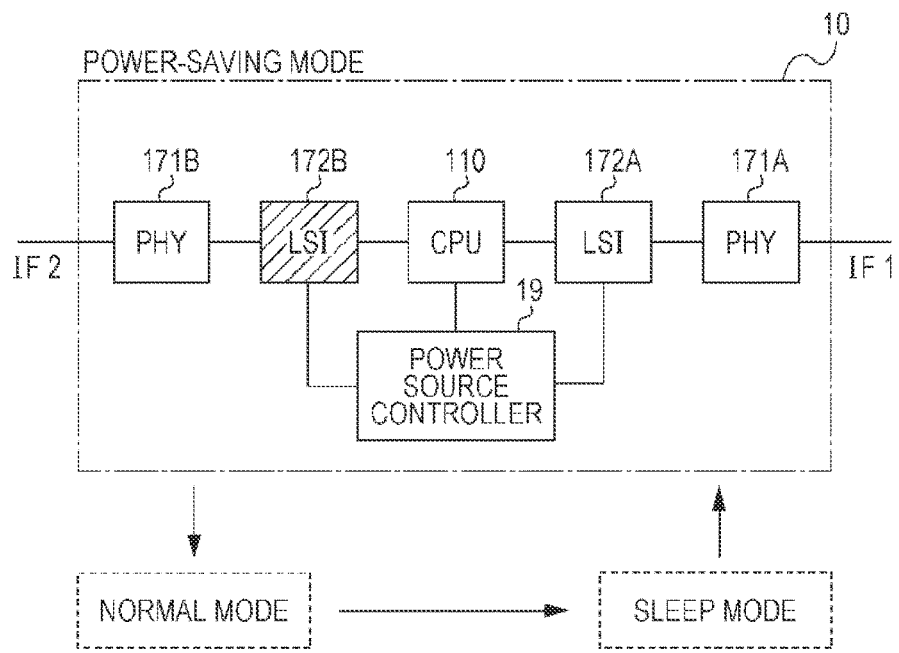
FIG. 5 is a diagram illustrating operation modes of the image forming apparatus.
FIG. 6 is a diagram illustrating power-saving performance comparisons between the operation modes.

FIG. 5 is a diagram illustrating the operation modes of the image forming apparatus 10 in the exemplary embodiment according to the invention. Note that operation states of the various units in the normal mode and in the sleep mode are similar to those for FIG. 3, and thus illustration thereof is omitted here. In the exemplary embodiment according to the invention, the image forming apparatus 10 realizes a power-saving mode in addition to the above-described normal mode and sleep mode. The power-saving mode is an operation mode in which the CPU 110 is on and either one of the LSI 172A and the LSI 172B is in the response standby mode (a mixture of an LSI 172 operating in the response standby mode and an LSI 172 operating in the pass-thru mode). FIG. 5 illustrates a state which is an example of the power-saving mode and in which the LSI 172A is in the pass-thru mode and the LSI 172B is in the response standby mode. In the power-saving mode, packets received by the communication IF corresponding to an LSI 172 operating in the pass-thru mode are transmitted to the CPU 110 via the LSI 172. Packets received by the communication IF corresponding to an LSI 172 operating in the response standby mode are processed by the LSI 172 without being transmitted to the CPU 110.

In the exemplary embodiment according to the invention, when the image forming apparatus 10 is in the sleep mode, if a recovery packet is received by the communication IF 1 or the communication IF 2, the operation mode of the image forming apparatus 10 is switched from the sleep mode to the power-saving mode. Here, among the LSI 172A and the LSI 172B, the operation mode of an LSI 172 corresponding to the communication IF that has received the recovery packet is switched from the response standby mode to the pass-thru mode, and the other LSI 172 still operates in the response standby mode. In addition, when the image forming apparatus 10 is in the power-saving mode, if a recovery packet is received by the communication IF corresponding to one LSI 172 that is in the response standby mode, the operation mode of the LSI 172 is switched from the response standby mode to the pass-thru mode and the operation mode of the image forming apparatus 10 is switched from the power-saving mode to the normal mode. Details of a process performed when the operation mode of the image forming apparatus 10 is switched from the sleep mode to the power-saving mode and of a process performed when the operation mode of the image forming apparatus 10 is switched from the power-saving mode to the normal mode will be described later.

FIG. 6 is a diagram illustrating power-saving performance comparisons between the operation modes realized by the image forming apparatus 10. In FIG. 6, the power-saving performance of each of the operation modes is indicated by one of three levels: "good", "not very good", and "not good". "Good" indicates the highest power-saving performance among the three operation modes. "Not very good" indicates the second highest power-saving performance after "good". "Not good" indicates the lowest power-saving performance among the three operation modes. As illustrated in FIG. 6, in the image forming apparatus 10 that is in the normal mode, the CPU 110 is on and all the LSIs 172 are in the pass-thru mode. Thus, the normal mode has the lowest power-saving performance among the three operation modes. In the image forming apparatus 10 that is in the sleep mode, the CPU 110 is off and all the LSIs 172 are in the response standby mode. Thus, the sleep mode has the highest power-saving performance among the three operation modes. In the image forming apparatus 10 that in the power-saving mode, the CPU 110 is on and there are both an LSI 172 operating in the pass-thru mode and an LSI 172 operating in the response standby mode. Thus, the power-saving mode has higher power-saving performance than the normal mode and has lower power-saving performance than the sleep mode. As described above, when the operation mode of the image forming apparatus 10 according to the exemplary embodiment according to the invention is switched from the sleep mode to the normal mode, the operation mode of the image forming apparatus 10 is switched not directly from the sleep mode to the normal mode but from the sleep mode to the power-saving mode and then to the normal mode.

Figure 7:
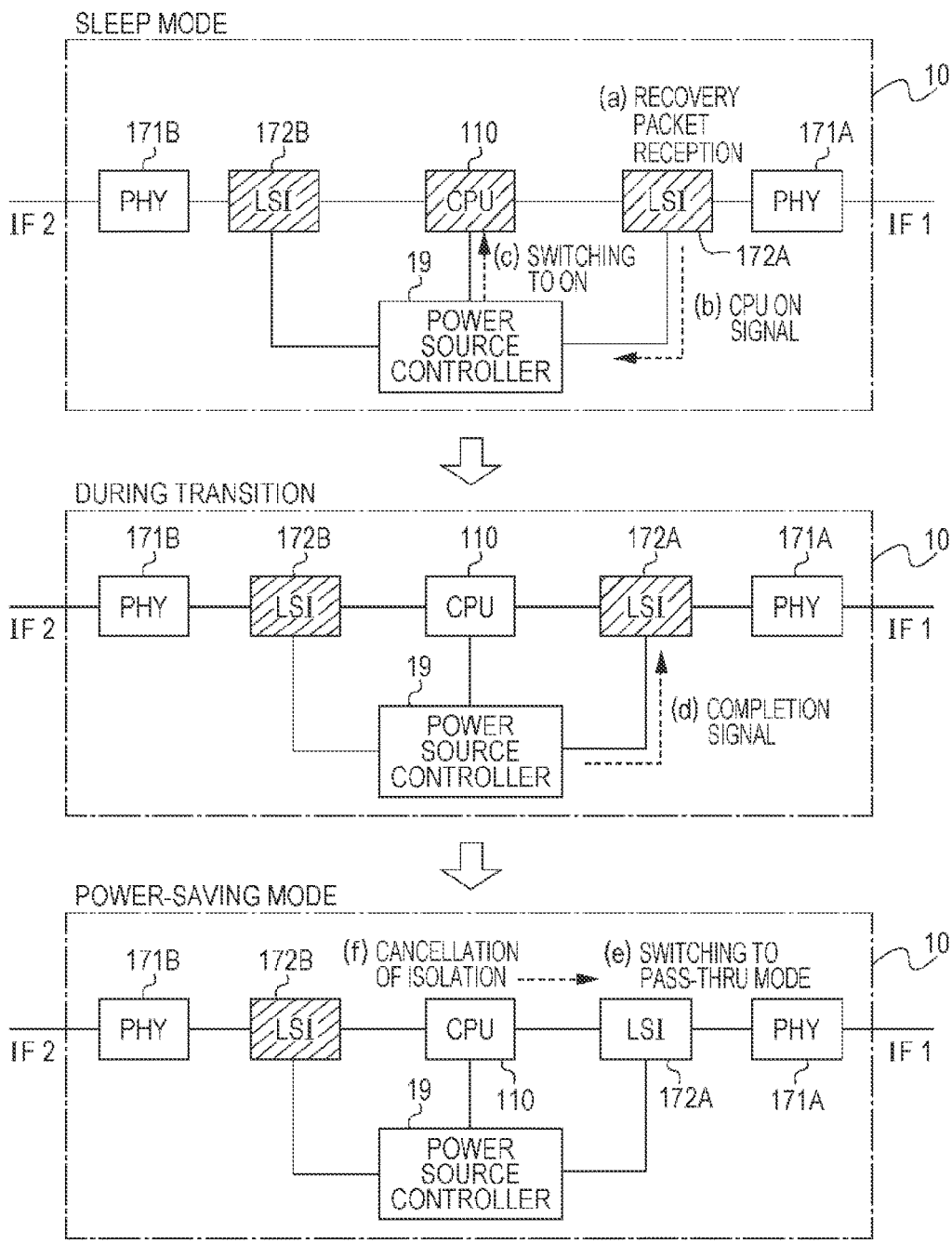
FIG. 7 is a diagram explaining a process performed when a sleep mode is switched to a power-saving mode.

FIG. 7 is a diagram explaining a process performed by the image forming apparatus 10 when the operation mode of the image forming apparatus 10 is switched from the sleep mode to the power-saving mode. FIG. 7 illustrates how the operation mode of the image forming apparatus 10 is switched from the sleep mode to the power-saving mode when a recovery packet is received by the communication IF 1. As illustrated in FIG. 7, when a recovery packet is received by the communication IF 1 ((a) in FIG. 7), the LSI 172A operating in the response standby mode outputs, to the power source controller 19, a signal for causing the CPU 110 to be on (hereinafter referred to as a "CPU on signal") ((b) in FIG. 7). When the power source controller 19 receives the CPU on signal, the power source controller 19 switches the CPU 110 from off to on ((c) in FIG. 7). After switching the CPU 110 to on, the power source controller 19 outputs a signal indicating that the CPU 110 has been switched to on (hereinafter referred to as a "completion signal") only to the LSI 172 that has output the CPU on signal (in this example, the LSI 172A) ((d) in FIG. 7). When the LSI 172A receives the completion signal, the operation mode of the LSI 172A is switched from the response standby mode to the pass-thru mode ((e) in FIG. 7). The CPU 110 and the LSI 172 are electrically insulated (isolated) from each other when the operation mode of the image forming apparatus 10 is switched from the normal mode to the sleep mode. When the CPU 110 is switched from off to on, the CPU 110 cancels the isolation from the LSI 172 that has output the CPU on signal ((f) in FIG. 7). In accordance with a series of processes illustrated in FIG. 7, the operation mode of the only LSI 172 corresponding to the communication IF 1 that has received the recovery packet is switched from the response standby mode to the pass-thru mode, and the packets received by the LSI 172 are transmitted to the CPU 110.

Figure 8:
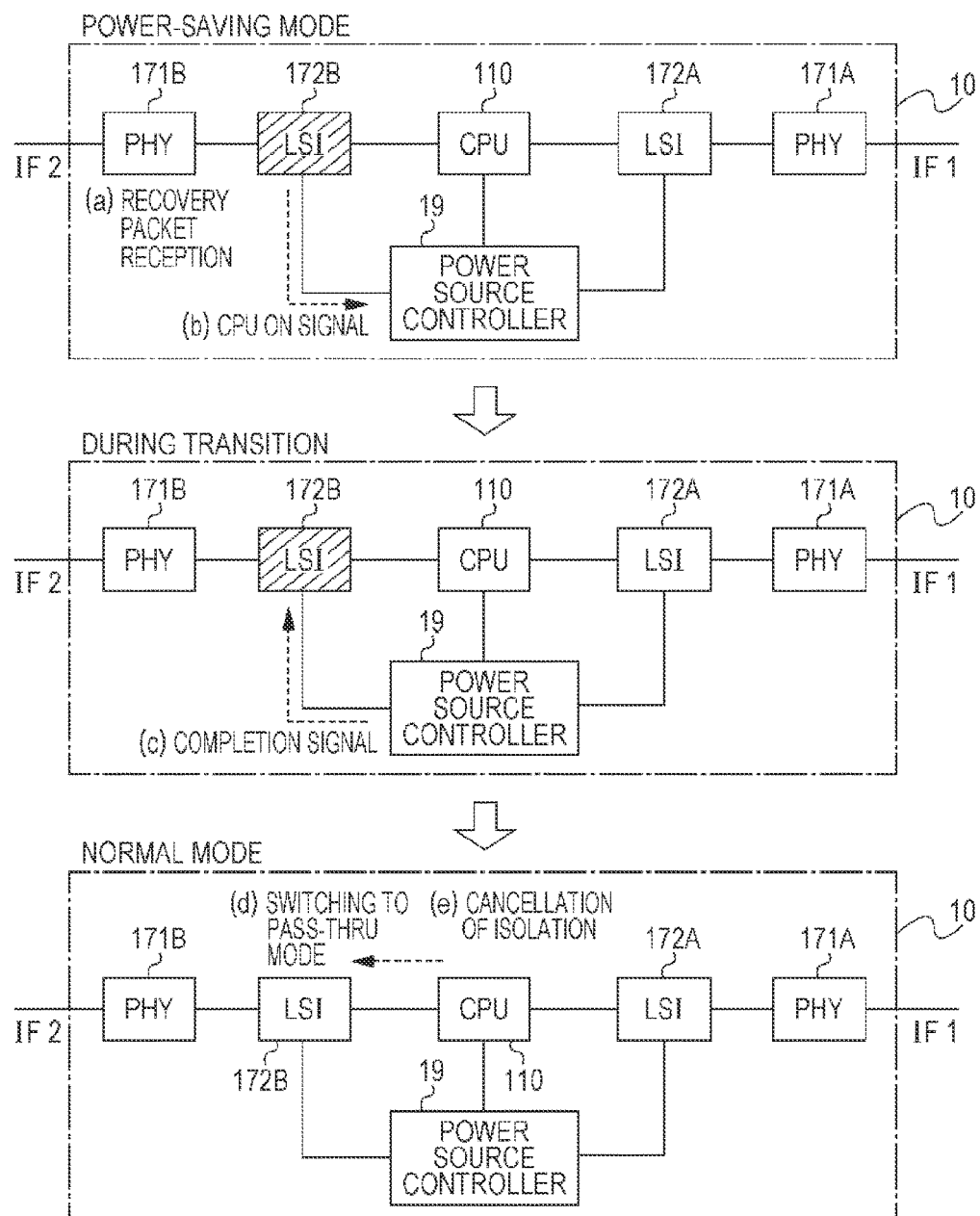
FIG. 8 is a diagram explaining a process performed when the power-saving mode is switched to a normal mode.

FIG. 8 is a diagram explaining a process performed by the image forming apparatus 10 when the operation mode of the image forming apparatus 10 is switched from the power-saving mode to the normal mode. FIG. 8 illustrates how the operation mode of the image forming apparatus 10 is switched from the power-saving mode to the normal mode when a recovery packet is received by the communication IF 2. As illustrated in FIG. 8, when a recovery packet is received by the communication IF 2 ((a) in FIG. 8), the LSI 172B operating in the response standby mode outputs a CPU on signal to the power source controller 19 ((b) in FIG. 8). Since the CPU 110 is on in the power-saving mode, when the power source controller 19 receives the CPU on signal, the power source controller 19 outputs a completion signal only to the LSI 172 that has output the CPU on signal (in this example, the LSI 172B) ((c) in FIG. 8). When the LSI 172B receives the completion signal, the operation mode of the LSI 172B is switched from the response standby mode to the pass-thru mode ((d) in FIG. 8). The CPU 110 cancels the isolation from the LSI 172 that has output the CPU on signal ((e) in FIG. 8).

Figure 9:
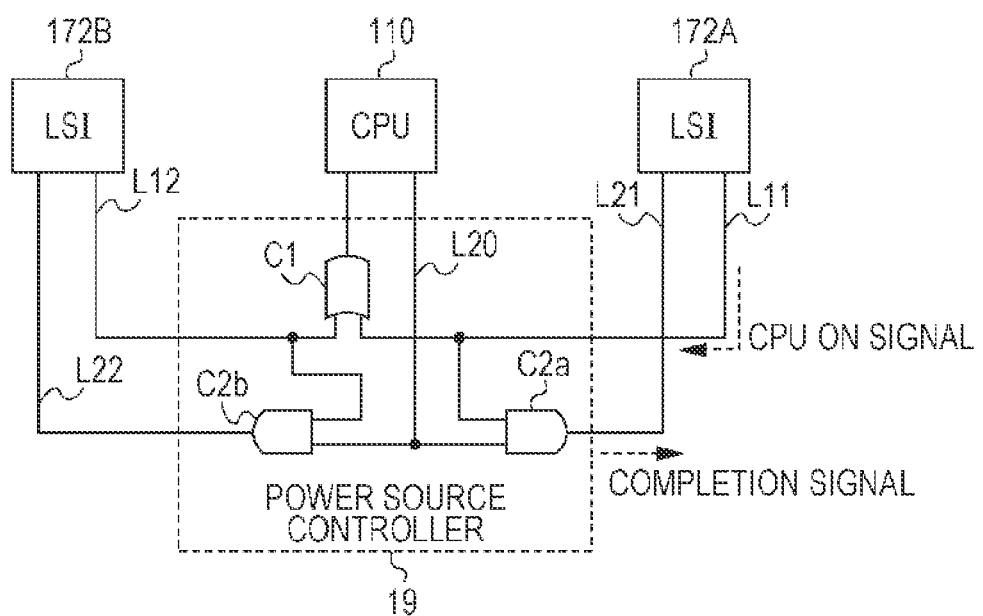
FIG. 9 is a schematic diagram of logic circuits in a power source controller.

FIG. 9 is a schematic diagram of an example of logic circuits in the power source controller 19. FIG. 9 illustrates logic circuits by which the power source controller 19 outputs a completion signal only to the LSI 172 that has output a CPU on signal. A signal line L11 is a signal line for transferring a CPU on signal from the LSI 172A to the power source controller 19. A signal line L12 is a signal line for transferring a CPU on signal from the LSI 172B to the power source controller 19. A signal line L20 is a signal line for transferring a completion from the CPU 110 to the power source controller 19. A signal line L21 is a signal line for transferring a completion signal from the power source controller 19 to the LSI 172A. A signal line L22 is a signal line for transferring a completion signal from the power source controller 19 to the LSI 172B. In FIG. 9, the power source controller 19 includes one OR circuit C1 and two AND circuits C2 (C2a and C2b). Two input terminals of the OR circuit C1 are connected to the signal line L11 and the signal line L12, and an output terminal of the OR circuit C1 is connected to the CPU 110. As a result, when a CPU on signal is output from the LSI 172A or the LSI 172B, the power source controller 19 switches the CPU 110 to on (in FIG. 9, the CPU on signal is output to the CPU 110). One of two input terminals of the AND circuit C2a is connected to the signal line L11 and the other input terminal is connected to the signal line L20. Note that upon receiving a CPU on signal from the power source controller 19, the CPU 110 is switched to on and outputs a completion signal to the power source controller 19 via the signal line L20. An output terminal of the AND circuit C2a is connected to the signal line L21. As a result, only in the case where the LSI 172A has output a CPU on signal, a completion signal is output to the LSI 172A. One of two input terminals of the AND circuit C2b is connected to the signal line L12 and the other input terminal is connected to the signal line L20. An output terminal of the AND circuit C2b is connected to the signal line L22. As a result, only in the case where the LSI 172B has output a CPU on signal, a completion signal is output to the LSI 172B.

Figure 10:
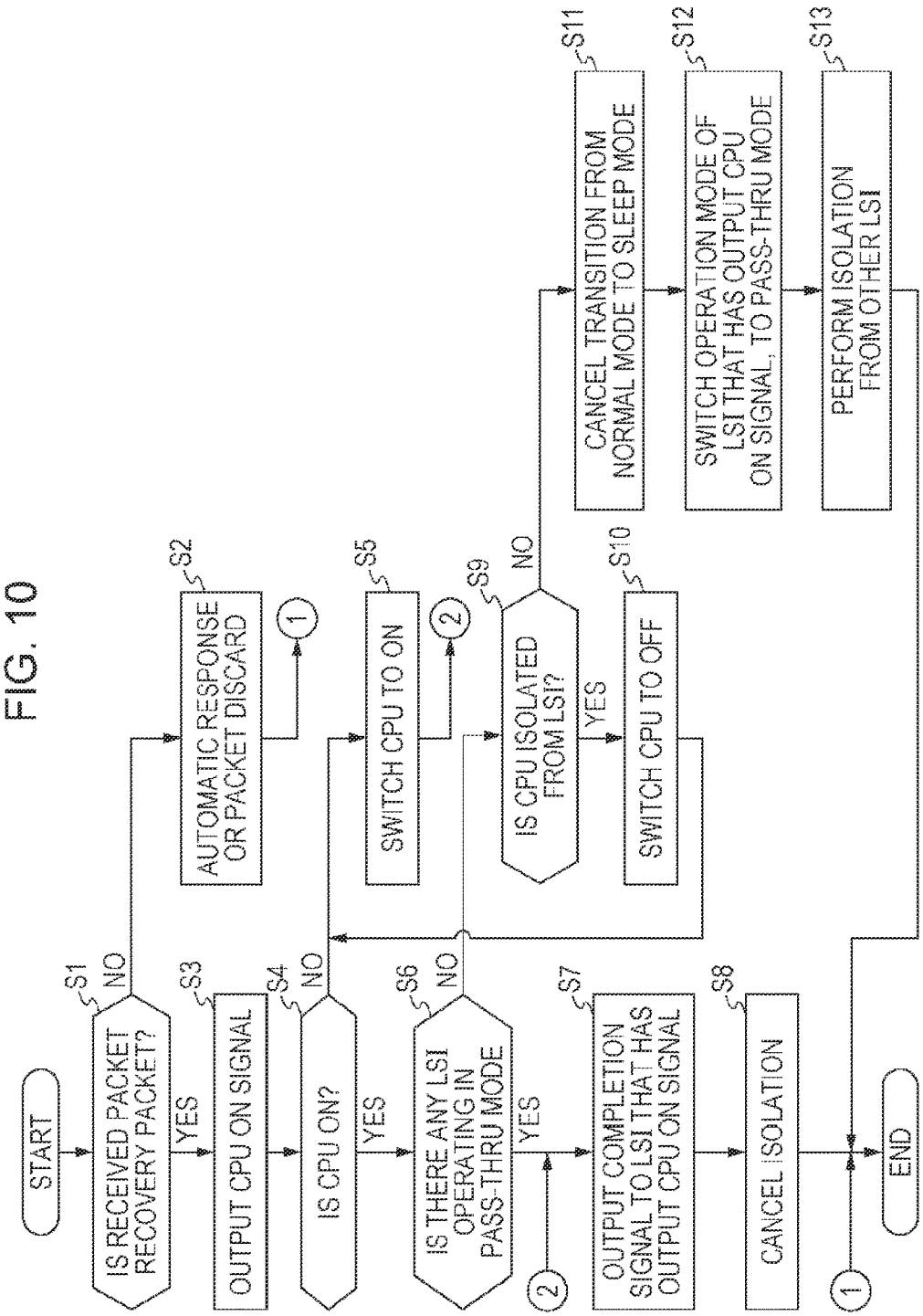
FIG. 10 is a flowchart illustrating a process performed by the image forming apparatus.

FIG. 10 is a flowchart illustrating a process performed by the image forming apparatus 10. The process illustrated in FIG. 10 is started when a packet is received by a communication IF controlled by an LSI 172 operating in the response standby mode. Note that, in FIG. 10, the process from step S1 to step S3 is executed by an LSI 172 corresponding to a communication IF that has received a packet among the LSI 172A and the LSI 172B.

In step S1, the LSI 172 determines whether or not the packet received by the communication IF is a recovery packet. The LSI 172 determines whether or not the packet is a recovery packet by, for example, analyzing the protocol and destination (an Internet Protocol (IP) address and a port number) of the packet received by the communication IF. In the case where it is determined that the received packet is not a recovery packet (NO in S1), the process proceeds to step S2. In the case where it is determined that the received packet is a recovery packet (YES in S1), the process proceeds to step S3.

In step S2, the LSI 172 performs automatic response to the received packet or discards the received packet. For certain packets, information on a correspondence relationship between a combination of the protocol and destination of each packet and an operation that the LSI 172 performs for the packet (hereinafter referred to as "correspondence information") is prestored in a storage area of the LSI 172. The LSI 172 performs automatic response to the packet or discards the packet in accordance with this correspondence information. After processing in step S2 is performed, the process illustrated in FIG. 10 ends.

In step S3, the LSI 172 outputs a CPU on signal to the power source controller 19. In step S4, the power source controller 19 determines whether or not the CPU 110 is on. In the case where it is determined that the CPU 110 is off (NO in S4), the process proceeds to step S5. In the case where the image forming apparatus 10 is in the sleep mode, it is determined, in step S4, that the CPU 110 is off. In the case where it is determined that the CPU 110 is on (YES in S4), the process proceeds to step S6.

In step S5, the power source controller 19 switches the CPU 110 from off to on. After the power source controller 19 performs processing in step S5, the process proceeds to step S7.

In step S6, the power source controller 19 determines whether or not there is any LSI 172 operating in the pass-thru mode. In the case where there is an LSI 172 operating in the pass-thru mode (YES in S6), the process proceeds to step S7. In the case where the image forming apparatus 10 is in the power-saving mode, it is determined, in step S6, that there is an LSI 172 operating in the pass-thru mode. In the case where there is no LSI 172 operating in the pass-thru mode (NO in S6), the process proceeds to step S9. In the case where the operation mode of the image forming apparatus 10 is changing from the normal mode to the sleep mode, it is determined, in step S6, that there is no LSI 172 operating in the pass-thru mode.

In step S7, the power source controller 19 outputs a completion signal to the LSI 172 that has output a CPU on signal in step S3 among the LSI 172A and the LSI 172B. A mechanism for outputting a completion signal to an LSI 172 that has output a CPU on signal is as illustrated in FIG. 9. Upon outputting a completion signal, the power source controller 19 stores an identifier that identifies the LSI 172, which is the destination of the completion signal, in the storage area of the power source controller 19. In the storage area of the power source controller 19, an identifier is stored that identifies an LSI 172 to which the last completion signal is output. The operation mode of the LSI 172 to which a completion signal is input is switched from the response standby mode to the pass-thru mode.

In step S8, the CPU 110 cancels isolation from the LSI 172 to which a completion signal is output in step S7. Specifically, the CPU 110 determines the LSI 172 to which a completion signal is output in step S7 by referring to the identifier stored in the storage area of the power source controller 19, and cancels the isolation from the LSI 172. Note that the CPU 110 may determine the LSI 172 to which a completion signal is output, by monitoring a completion signal traveling in the signal lines L21 and L22 that connect the power source controller 19 to the LSIs 172.

In step S9, the power source controller 19 determines whether or not the CPU 110 is isolated from the LSI 172. In the case where it is determined that the CPU 110 is isolated from the LSI 172 (YES in S9), the process proceeds to step S10. In the case where it is determined that the CPU 110 is not isolated from the LSI 172 (NO in S9), the process proceeds to step S11.

In step S10, the power source controller 19 switches the CPU 110 from on to off. After the power source controller 19 performs processing in step S10, the process proceeds to step S5. In step S11, the CPU 110 cancels transition of the operation mode thereof from the normal mode to the sleep mode. Specifically, the CPU 110 cancels the isolation from the LSI 172. In step S12, the power source controller 19 switches, from the response standby mode to the pass-thru mode, the operation mode of the LSI 172 that has output a CPU on signal in step S3 among the LSI 172A and the LSI 172B. Specifically, the power source controller 19 outputs a completion signal to the LSI 172 that has output a CPU on signal in step S3. In step S13, the CPU 110 performs isolation from the other LSI 172, which is different from the LSI 172 the operation mode of which is switched to the pass-thru mode in step S12. Specifically, the CPU 110 determines the LSI 172 to which a completion signal is output in step S12 by referring to the identifier stored in the storage area of the power source controller 19, and performs isolation from the other LSI 172, which is different from the LSI 172.

As explained above, in the image forming apparatus 10 according to the exemplary embodiment according to the invention, the operation mode of the LSI 172A and the operation mode of the LSI 172B are individually switched between the pass-thru mode and the response standby mode.

The invention is not limited to the above-described exemplary embodiment, and various modifications may be made. In the following, some modifications are explained. Among the modifications explained in the following, two or more of the modifications may be combined and used.

(1) First Modification

The power source controller 19 may individually control plural LSIs 172 in terms of switching the operation mode from the pass-thru mode to the response standby mode. For example, the power source controller 19 determines whether or not power-saving conditions are met on a communication-IF-by-communication-IF basis, and may switch the operation mode of an LSI 172 corresponding to a communication IF for which the power-saving conditions are met from the pass-thru mode to the response standby mode.

(2) Second Modification

Power-saving conditions are not limited to those described in the exemplary embodiment. For example, performing of no operation on the operation unit 13 for over a predetermined time period and the like may also be set as power-saving conditions.

(3) Third Modification

The types and number of signals output from the LSIs 172 and the power source controller 19 are not limited to those of the signals described in the exemplary embodiment. For example, the power source controller 19 may also switch the operation mode of such an LSI 172 from the response standby mode to the pass-thru mode by outputting another signal to the LSI 172 in addition to a completion signal.

(4) Fourth Modification

The mechanisms with which the power source controller 19 outputs a completion signal only to an LSI 172 that has output a CPU on signal is not limited to the logic circuits illustrated in FIG. 9. For example, an identifier that identifies an LSI 172 that has output a CPU on signal may be prestored in the storage area of the power source controller 19 and the power source controller 19 may also output a completion signal to an LSI 172 uniquely identified by referring to the identifier.

(5) Fifth Modification

The exemplary embodiment according to the invention may also be applied to information processing apparatuses other than the image forming apparatus 10. For example, the exemplary embodiment according to the invention may also be applied to an image processing apparatus that performs image processing on image data and the like.

(6) Other Modifications

The configuration of the image forming apparatus 10 is not limited to the configuration illustrated in FIG. 1. In addition, the configuration of the communication unit 17 is not limited to the configuration illustrated in FIG. 3. For example, the communication unit 17 may also function as three or more communication IFs.

Various programs executed by the power source controller 19 and the CPU 110 in the exemplary embodiment may be stored in a computer readable storage medium such as a magnetic storage medium (a magnetic tape, a magnetic disk (a HDD, a flexible disk (FD), or the like), an optical storage medium (an optical disc (a compact disk (CD), a digital versatile disk (DVD), or the like), a magneto-optical storage medium, a semiconductor memory (a flash ROM or the like), or the like and then provided. In addition, this program may also be downloaded via a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a downstream processor configured to process data;
a communication unit comprising a first communication interface and a second communication interface, each configured to communicate with one or more networks;
a first circuit connected between the first communication interface and the downstream processor and a second circuit connected between the second communication interface and the downstream processor, each of the first and the second circuits configured to operate in a first mode, in which the respective circuit does not relegate processing of the data received from the respective communication interface to the downstream processor and performs response processing on at least a portion of the data, or a second mode, in which the respective circuit does not perform the response processing on data received from the respective communication interface and relegates processing of the data to the downstream processor; and
a controller configured to control the first circuit or the second circuit to switch between the first mode and the second mode,
wherein, in a case in which the first circuit and the second circuit are operating in the first mode and a predetermined data is received by the first communication interface connected to the first circuit, the controller is further configured to control the downstream processor to switch from a sleep mode to a power-saving mode, control the first circuit to switch from the first mode to the second mode, and control the second circuit to remain operating in the first mode even after the downstream processor has switched to the power-saving mode in response to the received predetermined data,
wherein, in response to receiving a power on signal from the downstream processor, the controller is further configured to transmit a notification signal only to the first circuit, among the first and the second circuits; and
wherein the first and the second circuits consume less power while operating in the first mode when the downstream processor is operating in the sleep mode than while switching to and operating in the second mode when the downstream processor is operating in the power-saving mode.

2. The information processing apparatus according to claim 1, wherein the controller is further configured to keep the second circuit, which did not receive the predetermined data, to remain operating in the first mode.

3. A non-transitory computer readable medium storing a program causing a computer to execute a process, the computer including a downstream processor configured to process data; a communication unit comprising a first communication interface and a second communication interface, each configured to communicate with one or more networks; and a first circuit connected between the first communication interface and the downstream processor and a second circuit connected between the second communication interface and the downstream processor, each of the first and the second circuits configured to operate in a first mode, in which the respective circuit does not relegate processing of data received from the respective communication interface to the downstream processor and performs response processing on at least a portion of the data, or a second mode, in which the respective circuit does not perform the response processing on data received from the respective communication interface and relegates processing of the data to the downstream processor, the process comprising:
operating the first circuit and the second circuit in the first mode;
receiving a predetermined data is received by the first communication interface connected to the first circuit; and
controlling the downstream processor to switch from a sleep mode to a power-saving mode, controlling the first circuit to switch from the first mode to the second mode, and controlling the second circuit to remain operating in the first mode even after the downstream processor has switched to the power-saving mode in response to the received predetermined data,
wherein, in response to receiving a power on signal from the downstream processor, transmitting a notification signal only to the first circuit, among the first and the second circuits, and
wherein the first and the second circuits consume less power while operating in the first mode when the downstream processor is operating in the sleep mode than while switching to and operating in the second mode when the downstream processor is operating in the power-saving mode.

4. An information processing method for an information processing apparatus including a downstream processor configured to process data; a communication unit comprising a first communication interface and a second communication interface, each configured to communicate with one or more networks; and a first circuit connected between the first communication interface and the downstream processor and a second circuit connected between the second communication interface and the downstream processor, each of the first and the second circuits configured to operate in a first mode, in which the respective circuit does not relegate processing of data received from the respective communication interface to the downstream processor and performs response processing on at least a portion of the data, or a second mode, in which the respective circuit does not perform the response processing on data received from the respective communication interface and relegates processing of the data to the downstream processor, the information processing method comprising:
- operating the first circuit and the second circuit in the first mode;
- receiving a predetermined data is received by the first communication interface connected to the first circuit; and
- controlling the downstream processor to switch from a sleep mode to a power-saving mode, controlling the first circuit to switch from the first mode to the second mode, and controlling the second circuit to remain operating in the first mode even after the downstream processor has switched to the power-saving mode in response to the received predetermined data,
- wherein, in response to receiving a power on signal from the downstream processor, transmitting a notification signal only to the first circuit, among the first and the second circuits, and
- wherein the first and the second circuits consume less power while operating in the first mode when the downstream processor is operating in the sleep mode than while switching to and operating in the second mode when the downstream processor is operating in the power-saving mode.

5. The non-transitory computer readable medium according to claim 3, wherein the process further comprising keeping the second circuit, which did not receive the predetermined data, to remain operating in the first mode.

6. The information processing method according to claim 4, further comprising keeping the second circuit, which did not receive the predetermined data, to remain operating in the first mode.

7. The information processing apparatus according to claim 1, wherein the first communication interface connects the first circuit to the one or more networks via a first communication line, and the second communication interface connects the second circuit to the one or more networks via a second communication line different from the first communication line.

8. The non-transitory computer readable medium according to claim 3, wherein the first communication interface connects the first circuit to the one or more networks via a first communication line, and the second communication interface connects the second circuit to the one or more networks via a second communication line different from the first communication line.

9. The information processing method according to claim 4, wherein the first communication interface connects the first circuit to the one or more networks via a first communication line, and the second communication interface connects the second circuit to the one or more networks via a second communication line different from the first communication line.

10. The information processing apparatus according to claim 1, further comprising:
- the downstream processor configured to operate in one of a third mode in which the first and the second circuits are in the first mode, in a fourth mode in which the first and the second circuits are in the second mode, and a fifth mode, in which, the first circuit is in the first mode and the second circuit is the second mode,
- wherein the downstream processor is configured to switch from the fourth mode to the fifth mode in response to the received predetermined data.

11. The non-transitory computer readable medium according to claim 3, wherein the downstream processor configured to operate in one of a third mode in which the first and the second circuits are in the first mode, in a fourth mode in which the first and the second circuits are in the second mode, and a fifth mode, in which, the first circuit is in the first mode and the second circuit is the second mode, and
- wherein the downstream processor is configured to switch from the fourth mode to the fifth mode in response to the received predetermined data.

12. The information processing method according to claim 4, wherein the downstream processor configured to operate in one of a third mode in which the first and the second circuits are in the first mode, in a fourth mode in which the first and the second circuits are in the second mode, and a fifth mode, in which, the first circuit is in the first mode and the second circuit is the second mode, and
- wherein the downstream processor is configured to switch from the fourth mode to the fifth mode in response to the received predetermined data.

13. The information processing apparatus according to claim 10, wherein the fourth mode is a normal mode, the third mode is the sleep mode in which the downstream processor is turned off, and the fifth mode is the power-saving mode in which the downstream processor consumes less power than while switching to and operation in the normal mode.

14. The non-transitory computer readable medium according to claim 11, wherein the fourth mode is a normal mode, the third mode is the sleep mode in which the downstream processor is turned off, and the fifth mode is the power-saving mode in which the downstream processor consumes less power than while switching to and operation in the normal mode.

15. The information processing method according to claim 12, wherein the fourth mode is a normal mode, the third mode is the sleep mode in which the downstream processor is turned off, and the fifth mode is the power-saving mode in which the downstream processor consumes less power than while switching to and operation in the normal mode.

16. The information processing apparatus according to claim 1, wherein the controller is further configured to control the downstream processor to switch from a sleep mode to a power-saving mode, control the first circuit to switch from the first mode to the second mode, and control the second circuit to remain operating in the first mode even after the downstream processor has switched to the power-saving mode in response to the received predetermined data, in response to receiving a recovery packet.

17. The information processing apparatus according to claim 1, wherein the controller comprises an OR circuit, a first AND circuit and a second AND circuit.

18. The information processing apparatus according to claim 17, wherein a first input terminal of the OR circuit is connected to the first circuit, a second input terminal of the OR circuit is connected to the second circuit and an output terminal of the OR circuit is connected to the downstream processor.

19. The information processing apparatus according to claim 17, wherein a first input terminal of the first AND circuit is connected to the first circuit, a second input terminal of the first AND circuit is connected to the downstream processor and an output terminal of the second AND circuit is connected to the first circuit.

20. The information processing apparatus according to claim 17, wherein a first input terminal of the second AND circuit is connected to the second circuit, a second input terminal of the second AND circuit is connected to the downstream processor and an output terminal of the second AND circuit is connected to the second circuit.

* * * * *